United States Patent [19]

Tanimoto et al.

[11] Patent Number: 6,075,776
[45] Date of Patent: Jun. 13, 2000

[54] VLAN CONTROL SYSTEM AND METHOD

[75] Inventors: Shigeaki Tanimoto, Tokyo; Hikoyuki Nakajima, Yokohama; Kunihiko Isoda, Yokosuka; Kouichi Nagai, Yokosuka; Takashi Masui, Yokosuka, all of Japan

[73] Assignee: Nippon Telegraph and Telephone Corporation, Tokyo, Japan

[21] Appl. No.: 08/870,655

[22] Filed: Jun. 6, 1997

[30] Foreign Application Priority Data

Jun. 7, 1996 [JP] Japan .................................. 8-145854

[51] Int. Cl.[7] ............................................. H04L 12/28
[52] U.S. Cl. ........................ 370/254; 370/338; 370/401
[58] Field of Search .................................. 370/254, 338, 370/359, 389, 400, 401, 402, 419; 395/200.49, 200.98, 200.47, 200.1

[56] References Cited

U.S. PATENT DOCUMENTS

| 5,752,003 | 5/1998 | Hart ........................................ 395/500 |
| 5,764,639 | 6/1998 | Staples et al. .......................... 370/401 |

OTHER PUBLICATIONS

S. Tanimoto, et al., "Logical Office Service", Articles of NTT Multimedia Networks Laboratories, pp. 987–996, 1996.

T. Hariu, et al., "Logical Office Service: A Mobile VLAN Service for a Mobile Computing Environment", Proceedings of 1997 Asia–Pacific Symposium on Information and Telecommunication Technologies (APSITT '97), pp. 1.5.1–1.5.5, Mar. 13, 1997.

Y. Shigyo, et al., "A Study on Address Resolution for Virtual LAN", Proceedings of the 1996 IEICE General Conference, p. 241, Mar. 28–31, 1996.

*Primary Examiner*—Chau Nguyen
*Assistant Examiner*—Kim T. Nguyen
*Attorney, Agent, or Firm*—Finnegan, Henderson, Farabow, Garrett & Dunner, L.L.P.

[57] ABSTRACT

A VLAN control system is provided, which comprises: a remote access server, connected to a home network in the VLAN having a global network, for controlling communication between any moved terminal and the home network with reference to a management table for indicating a location of each terminal under connection; a remote access client, connected to each remote network, for controlling communication between the remote network and the global network with reference to a management table for indicating a correspondence relationship between each terminal which is connected to the remote network and the home network; and a VLAN management server, connected to the global network, for managing packet transmission and the location of each terminal with reference to a management table for indicating a correspondence relationship between each terminal and the remote access server and for indicating a location of each terminal under connection. In the control system, disconnection of a terminal which has been moved to a remote network is detected, without any special function at the terminal side, based on timing information of a packet transmitted from the terminal or connection information if the terminal is further moved to another remote network. A VLAN control method corresponding to the above system is also provided.

17 Claims, 12 Drawing Sheets

FIG.2

| MAC ADDRESS OF TE | HOME NETWORK ADDRESS OF TE (IP ADDRESS OF RAS) |
|---|---|
| MAC ADDRESS OF TE 101 | IP ADDRESS OF RAS 301 |
| MAC ADDRESS OF TE 102 | IP ADDRESS OF RAS 301 |
| ⋮ | ⋮ |

| MAC ADDRESS OF TE | LOCATIONAL INFORMATION OF TE (IP ADDRESS OF RAS OR RAC) |
|---|---|
| MAC ADDRESS OF TE 101 | IP ADDRESS OF RAS 301 |
| MAC ADDRESS OF TE 102 | IP ADDRESS OF RAS 301 |
| ⋮ | ⋮ |

| MAC ADDRESS OF MOBILE TE | MAC ADDRESS OF MOBILE TE (IP ADDRESS OF RAS) |
|---|---|
| MAC ADDRESS OF TE 101 | IP ADDRESS OF RAS 301 |
| ⋮ | ⋮ |

70

VLAN CONTROL SYSTEM AND METHOD

BACKGROUND OF THE INVENTION

1. Field of the Invention

In order to establish an environment of terminal mobility, which is one of the advantages of a LAN, in a wide LAN environment using the Internet or intranets, it is necessary to specify the access location of each terminal in such a network; thus, detection of connection and disconnection of each terminal is required. Among these functions, the present invention relates to a technique for realizing detection of terminal disconnection. This application is based on a patent application No. Hei 8-145854 filed in Japan, the contents of which are incorporated herein by reference.

2. Description of the Related Art

In order to establish an environment in which terminals can move in the Internet or intranets to which plural subnetworks are connected (that is, a Virtual LAN or VLAN system), it is necessary to provide a terminal management table for managing terminal (access) location in a router which accommodates terminals, or the like, and to automatically update this table in accordance with movement of the terminals. An apparatus having such a function is called a "client". In addition to providing such a client, specification of the location of each terminal is required for realizing movement of each terminal to any point in the above networks. For such a requirement, detection of terminal disconnection is necessary. In conventional disconnection processes, a user of a terminal to be disconnected gives instructions indicating that the terminal will soon be disconnected, and the client is informed of results of the disconnection. However, in this method, it is necessary to add a special function in each terminal, and thus there has been a problem in that terminals on the market cannot be directly used with their original specification.

SUMMARY OF THE INVENTION

It is an object of the present invention to solve the above-mentioned problem and to realize the detection of terminal disconnection without adding any special function in each terminal.

Therefore, the present invention provides a control system for a VLAN in which a home network to which one or more terminals are ordinarily connected, and at least one remote network to which said terminals are connected when they are moved, are connected with each other via a global network, said system comprising:

- a remote access server connected to the home network, said server having an address for the global network, and in which a management table for indicating a location of each terminal under connection is provided, wherein when one of the terminals is moved to one of said at least one remote network, the remote access server controls access between the terminal and the home network as if the terminal performs the access in the home network;
- a remote access client connected to each remote network, said client having an address for the global network, and in which a management table for indicating a correspondence relationship between each terminal which is connected to the remote network and the home network is provided, and the remote access client for controlling communication between the remote network and the global network; and
- a VLAN management server connected to the global network, said server having an address for the global network, and in which a management table for indicating a correspondence relationship between each terminal and the remote access server and for indicating a location of each terminal under connection is provided, and the VLAN management server for managing packet transmission and the location of each terminal, wherein if one of the terminals is connected to one of said at least one remote network and is managed in the remote network, disconnection of the terminal from the remote network is detected based on timing information of a packet transmitted from the terminal or connection information if the terminal is further moved to another remote network, and processing control for changing management data of the system according to the terminal disconnection is performed via the VLAN management server.

The present invention also provides a control method used in such a VLAN system, and if one of the terminals is connected to one of said at least one remote network and is managed in the remote network, said method comprises the steps of detecting disconnection of the terminal from the remote network based on timing information of a packet transmitted from the terminal or connection information if the terminal is further moved to another remote network; and performing processing control for changing management data of the system according to the terminal disconnection.

The following are desirable methods for the above terminal disconnection:

(1) Every time any terminal connected to each remote network transmits a packet, a monitoring timer for the terminal, whose timer value automatically increases, is set, and when the timer value exceeds a predetermined threshold value, it is judged that the terminal was disconnected;

(2) When one of the terminals is moved from a first remote network, to which the terminal has been connected under the management therein, to a second remote network, a packet transmission of the terminal is detected and it is recognized that the remote network to which the terminal was connected until that time is the first remote network, and a remote access client of the first remote network is notified of the terminal disconnection;

(3) A monitoring packet is sent for every predetermined time to each terminal which is connected to the relevant remote network, and it is judged that a relevant terminal was disconnected if a response packet is not returned from the relevant terminal.

According to the above method (1), when a fixed time passed after a terminal is disconnected, the disconnection can always be detected.

According to the above method (2), when a terminal is moved from the first remote network to the second remote network and transmits a packet, the disconnection can always be detected.

The above method (3) can be realized by transmitting a monitoring packet in accordance with an ordinary ARP method.

These methods may be used in a combination form.

The present invention also provides a VLAN management server and a remote access client having relevant functions in the above VLAN control system. The present invention further provides methods corresponding to these server and client, and also provides storage mediums for making a computer execute such a method.

Therefore, according to the present invention, terminal disconnection can be detected without providing any special system or process at the terminal side.

BRIEF DESCRIPTION OF THE DRAWINGS

FIG. 2 shows an example of the initial information management table.

FIG. 3 shows an example of the location information management table.

FIG. 4 shows an example of the home address management table.

DESCRIPTION OF THE PREFERRED EMBODIMENTS

Hereinbelow, preferred embodiments of the present invention will be explained in detail with reference to the drawings.

Figure 1:
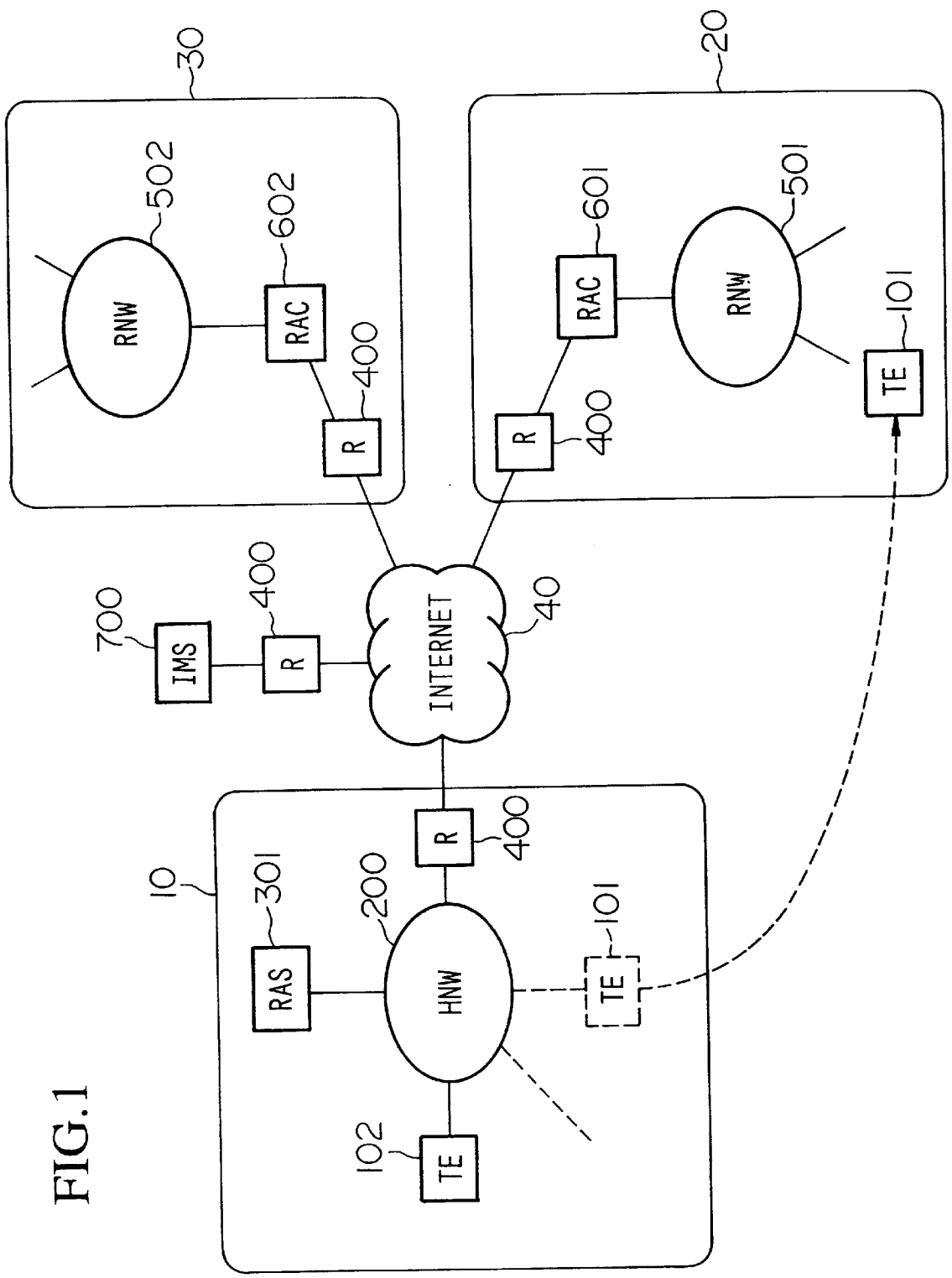
FIG. 1 shows an example of the VLAN control system according to the present invention.

FIG. 1 shows an embodiment of the VLAN control system according to the present invention. In the figure, reference numerals 10, 20, and 30 are offices, each having a sub-network for constructing the VLAN via the Internet (40). In addition, the present invention may be applied to a similar global packet network such as an intranet.

Office 10 includes a sub-network (called "HNW", i.e., home network, hereinbelow) 200 to which terminals (abbreviated to "TE(s)", hereinbelow) 101 and 102 in the figure are connected in an ordinary state. In addition, office 10 is called "home office", hereinbelow. To the HNW 200, a remote access server (abbreviated to a "RAS", hereinbelow) 301 is connected, and the HNW 200 is connected to the Internet 40 via router 400.

On the other hand, offices 20 and 30 have sub-networks (called RNW(s), i.e., remote network(s), hereinbelow) 501 and 502, respectively, and these offices will be called "remote offices" 20 and 30, hereinbelow. To the RNWs 501 and 502, remote access clients (abbreviated to "RAC(s)", hereinbelow) 601 and 602 are respectively connected, and these RACs are connected to the Internet 40 via routers 400.

In addition, VLAN management server (abbreviated to "IMS", hereinbelow) 700 is connected to the Internet 40 via router 400.

Figure 9:
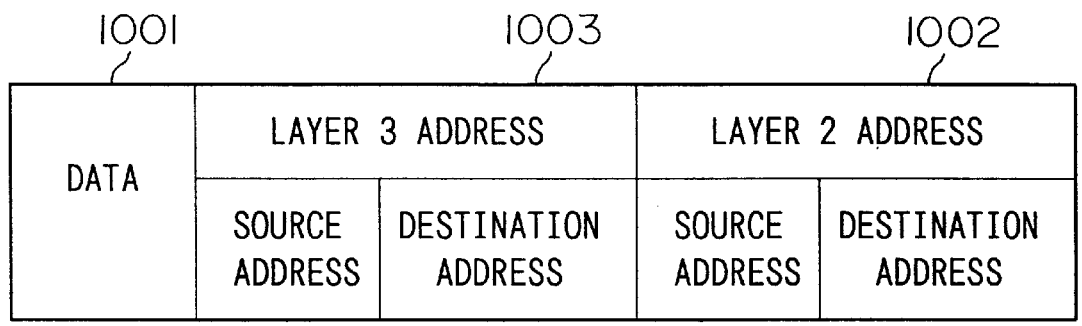
FIG. 9 shows an example of the address construction with respect to a packet.

Here, an example of the (address) structure of a packet is shown in FIG. 9. In the figure, reference numeral 1001 indicates data, reference numeral 1002 indicates a layer 2 address, while reference numeral 1003 indicates a layer 3 address. Each address consists of two addresses for sending and receiving (data). Specifically, layer 2 (of the OSI) is called a "frame", while layer 3 called a "packet"; however, both will be called packets as a transfer unit, here.

In a packet network, different addresses are assigned for the link level and the network level. Layer 2 address 1002 is known as a "MAC (Media access Control) address", which is provided by a vendor at the manufacture of each terminal and thus which is information for identifying each terminal in any location. On the other hand, layer 3 address 1003 is known as an "IP address", which is provided for identifying each terminal in each network, and thus which is fixedly provided with respect to a location or a connection point of each terminal. This address is used for routing packets.

Figure 10:
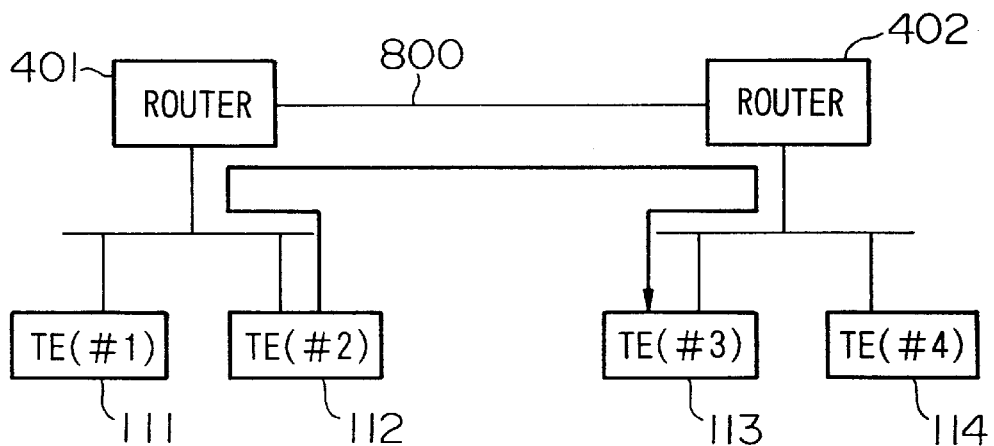
FIG. 10 shows an example of a packet transfer system.

FIG. 10 shows an example of the packet transfer system used in the packet network. In the figure, reference numerals 111–114 indicate terminals (that is, TEs), reference numerals 401 and 402 are routers, and reference numeral 800 indicates a communication path. In this example, layer 2 address "#1" and layer 3 address "#1" are assigned to TE 111. The arrow in FIG. 10 shows a state that packets are transferred from TE 112 to TE 113. When TE 112 transmits a packet, this packet is broadcasted to all TEs 111 and 112, and router 401 in a collision domain. At each receiving side, collation of a destination layer 2 address with respect to the packet and a layer 2 address assigned to the receiving side. If they agree with each other, the packet is accepted by the receiving side, while if they do not agree, the packet is rejected. Here, router 401 receives the packet.

In router 401, a table with respect to the correspondence between each destination layer 3 address and relevant path information, that is, a table of routing data, is previously stored. Accordingly, path control of the packets is performed based on this table. In this example, destination TE 113 is connected to communication path 800; thus, the packet is transmitted through path 800 in the routing control. In this way, the packet is finally transferred to TE 113.

Figure 11:
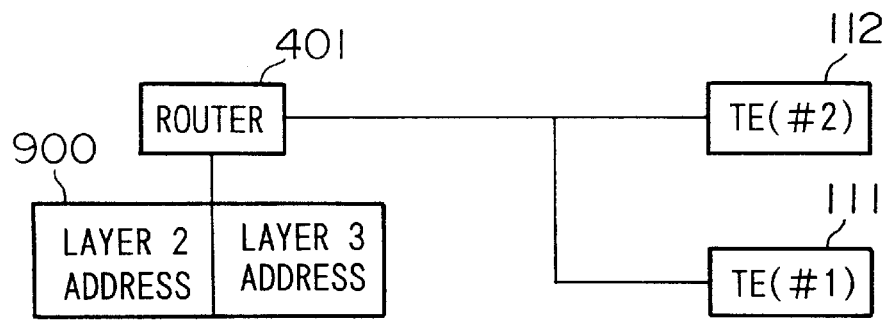
FIG. 11 shows an example of an address resolution method.

FIG. 11 is a diagram for explaining an example of the address resolution method known with respect to packet networks. In the figure, reference numeral 401 indicates a router, reference numerals 111 and 112 indicate TEs connected to and subordinated under router 401, and reference numeral 900 indicates an ARP (Address Resolution Protocol) cash managed by router 401.

This ARP cash is a memory for managing the correspondence between layer 2 and layer 3 addresses of each destination. If layer 3 address is known while layer 2 address is unknown for a destination, the layer 2 address can be acquired using the ARP cash, this method being known as the "ARP". When layer 2 address of TE 111 is required, router 401 broadcasts an ARP request packet, in which the layer 3 address of TE 111 is included, to all connected and subordinated TEs. The relevant TE (i.e., 111) which received the ARP request packet returns an ARP response packet including the layer 2 address of itself. Router 401 extracts the layer 2 address from the ARP response packet and stores it into ARP cash 900 to be used in later communication. In addition, the content of this ARP cash 900 is deleted after being kept for a specific period.

FIG. 2 shows initial information management table 50 for the VLAN, which is initially provided in IMS 700, and after this initialization, the VLAN is arranged with reference to this table. That is, this is a table for setting correspondence between MAC addresses of all TEs in the VLAN system and the IP address (i.e., the Internet address) of RAS 301.

FIG. 3 shows location information management table 60, provided in IMS 700 and RAS 301, for managing a correspondence relationship between the MAC address of each TE and the IP address (i.e., the Internet address) of the RAS or a RAC, the IP address functioning as locational information as for a network to which the TE is connected at the present time. According to this table, the IMS and RAS 301 can perform real-time management with respect to location of each TE.

FIG. 4 shows home address management table 70, provided in RACs 60 and 602, for managing a correspondence relationship between the MAC address of each TE connected to any RNW at the present time and the IP address of the RAS, which is the home address of the relevant TE. According to this table, RACs 601 and 602 can transfer a packet transmitted from the TE to the HNW 200.

Figure 5A:
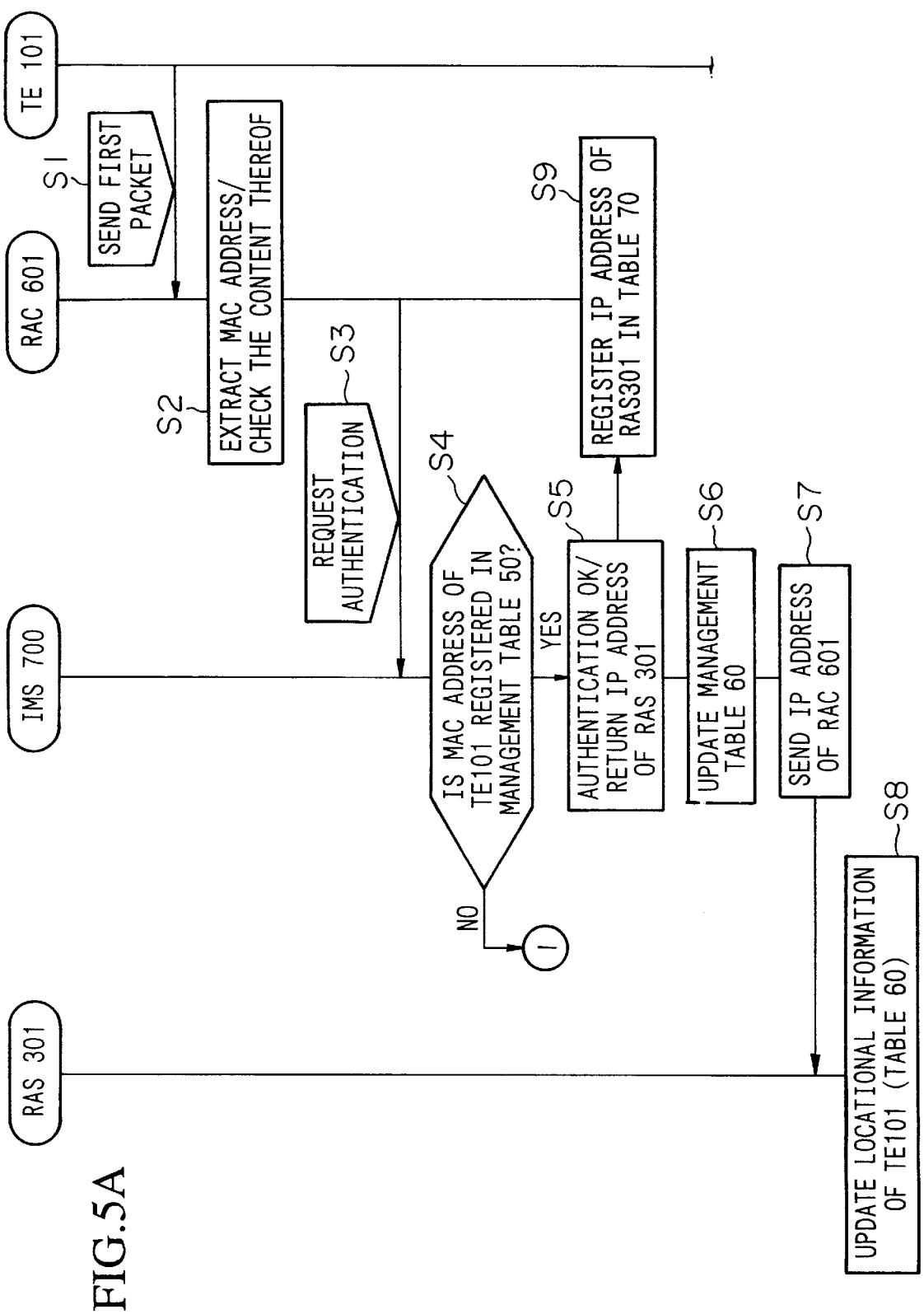
FIGS. 5A and 5B show the automatic authentication sequence used in the VLAN control system.
Figure 5B:
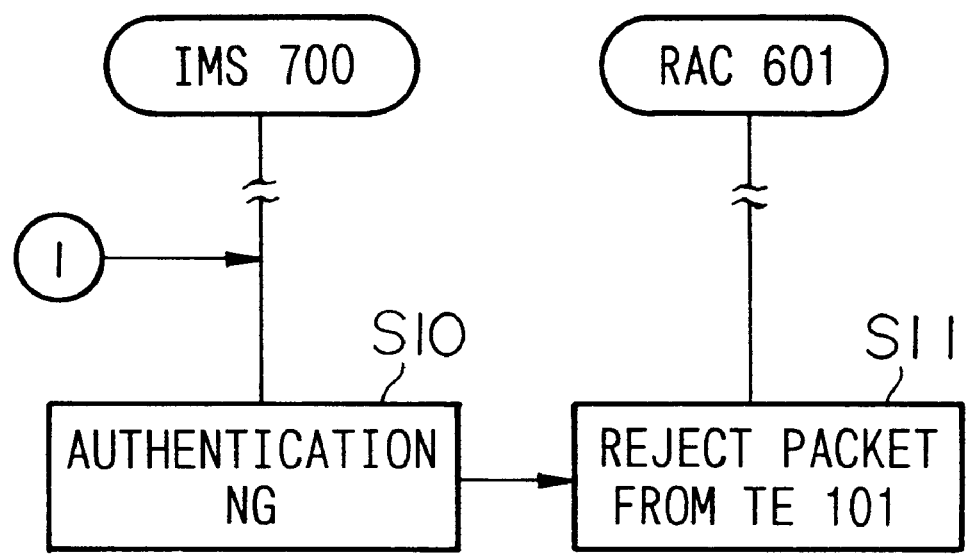

FIGS. 5A and 5B show the automatic authentication sequence in this VLAN control system. Hereinbelow, the principles of automatic authentication and location management (which are necessary when there is a TE connected to any RNW) in this system will be explained according to this sequence for the exemplary system arrangement shown in FIG. 1.

First, a case in which TE 101 is moved from the HNW 200 to RNW 501 will be explained.

When TE 101 sends a first packet (of the MAC frame) to TE 102 after TE 101 which belongs to HNW 200 moves to RNW 501 (see step S1), RAC 601, which is connected with RNW 501, acquires the packet and extracts the MAC address of source TE 101 from this packet (of the MAC frame), and checks whether the MAC address has already been authenticated according to home address management table 70 (see step S2).

Here, no entry can be found in home address management table 70 (that is, an unauthenticated state); thus, RAC 601 sends the IMS a request for authenticating TE 101 with the MAC address of TE 101 and the IP address of RAC 601 (see step S3). For this authentication request from RAC 601, IMS 300 performs authentication and address resolution with respect to the home address, based on the sent MAC address of TE 101 and with reference to the above-explained initial information management table 50.

That is, if the MAC address of TE 101 has been registered in the initial information management table 50 (see step S4), IMS 700 returns a packet indicating that the TE has been authenticated and also returns the IP address of RAS 301 of HNW 200 (see step S5). The IMS 700 then updates the content of location information management table 60 with respect to TE 101 which was moved (that is, the mobile TE) (see step S6), and sends RAS 301 of HNW 200 of the mobile TE 101 the IP address of RAC 601 (see step S7). Here, the IP address of RAC 601 corresponds to locational information in the Internet about TE 101.

RAS 301 updates locational information of the TE which the RAS manages in location information management table 60 (see step S8). RAC 601 makes home address management table 70 in accordance with the authentication response from IMS 700, and registers the IP address of RAS 301, which corresponds to the home address of TE 101, in the table (see step S9). In this way, authentication and address resolution are completed.

In the meantime, if the MAC address of TE 101 is not registered in initial information management table 50, EMS 700 returns a packet indicating that the TE was unauthenticated to RAC 601 (see step S10). According to this authentication "NG" packet, RAC 601 rejects the packet sent from TE 101 (see step S11).

Figure 6:
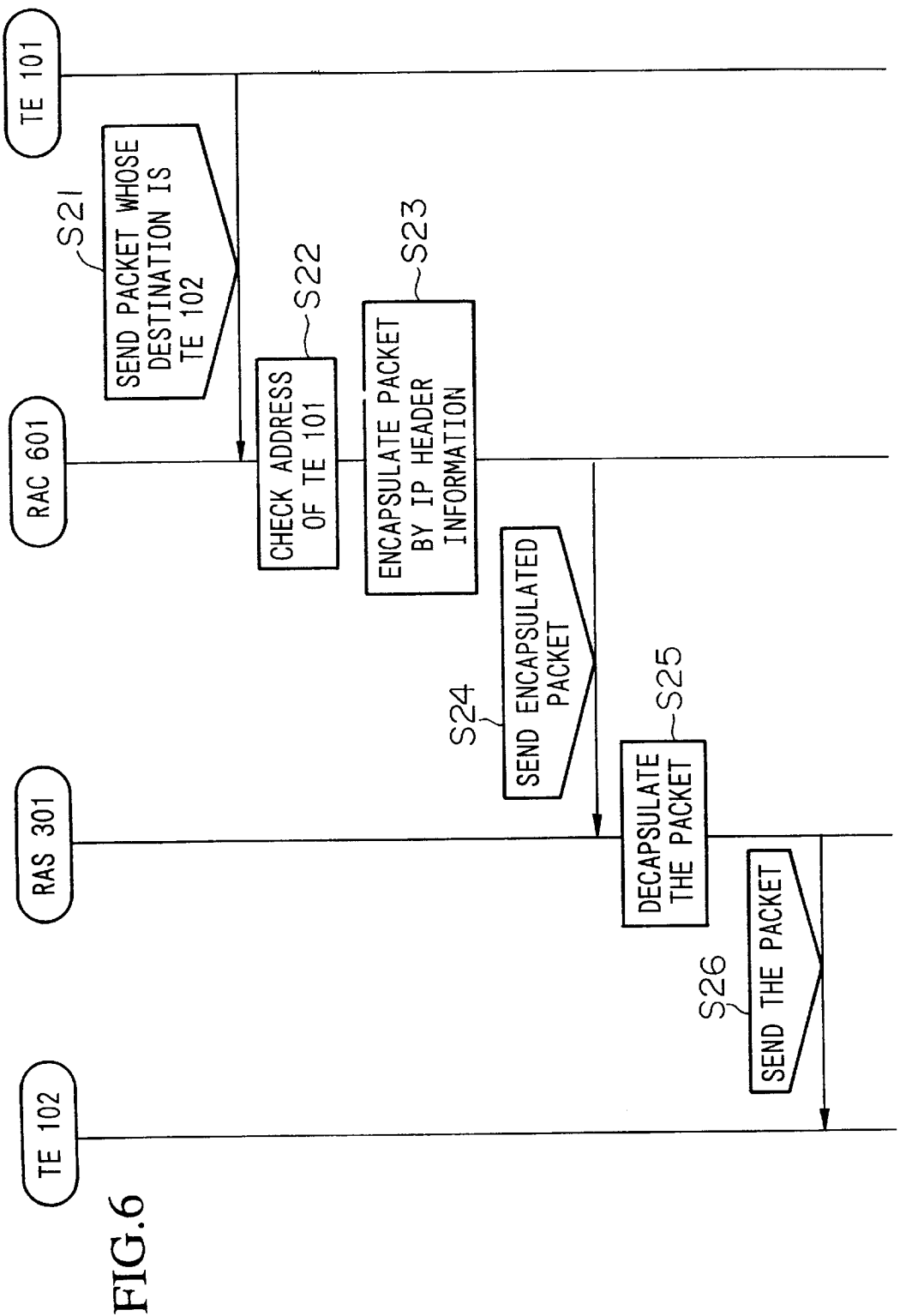
FIG. 6 shows an example of the automatic connection sequence in the control system.

FIG. 6 shows an exemplary sequence of automatic connection to the HNW (here, data transmission from TE 101 to TE 102) after the above-explained automatic authentication. Hereinbelow, the principle of automatic connection in conformity to multi-protocol processing will be explained in accordance with this sequence.

When a packet (of the MAC frame, and whose destination is TE 102) is sent from TE 101 (see step S21), RAC 601 of RNW 501 to which TE 101 was moved checks whether the TE was authenticated with reference to home address management table 70 so as to confirm the authentication (see step S22).

Next, based on the contents of home address management table 70, RAC 601 encapsulates the packet sent from TE 101, by adding IP header information, in which the destination IP address (i.e., DA) is set to be RAS 301 while the source IP address (i.e., SA) is set to be RAC 601, to the packet (see step S23). The encapsulated packet is sent from RAC 601 to RAS 301 of the HNW relating to TE 101 (see step S24).

RAS 301 decapsulates the transmitted packet including the IP header information (see step S25), and transmits the decapsulated packet to the HNW 200. Accordingly, TE 101 can sends a packet (of the MAC frame) from RNW 501 to TE 102 connected to the HNW 200, as if the TE 101 sends the packet in the HNW 200 (see step S26). In addition, by encapsulating the MAC frame, connection independent of the protocols of layer 3 or more of the OSI can be realized.

Figure 7:
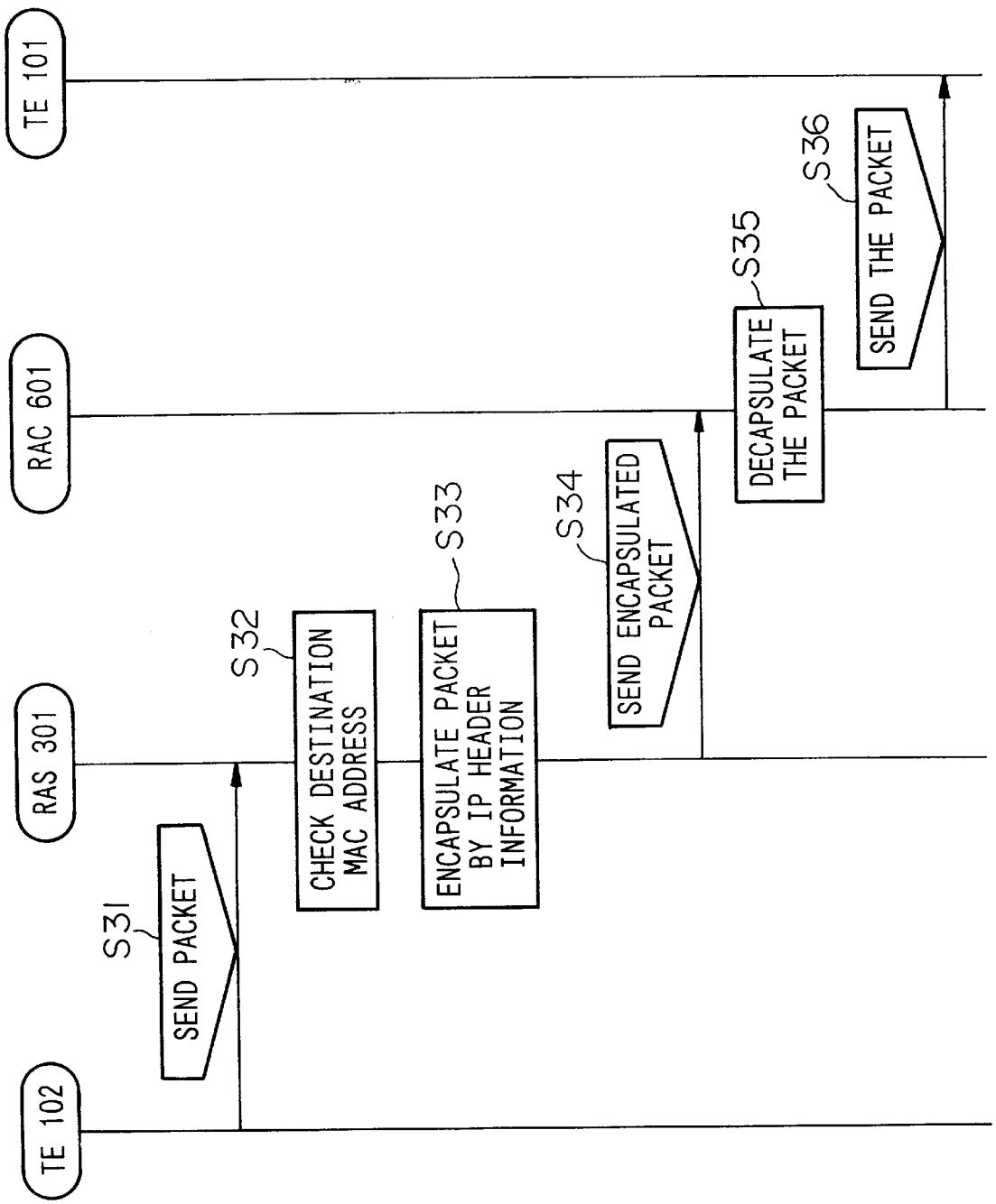
FIG. 7 shows an example of the automatic connection sequence in the control system.

On the other hand, an exemplary sequence of data transmission from TE 102 on the HNW to the mobile TE 101 will be shown in FIG. 7. In this case, a packet (of the MAC frame) sent from TE 102 is monitored by RAS 301 (see step S31). Next, the location indicated by the destination MAC address is checked according to location information management table 60 (see step S32). If the destination address agrees with the MAC address of the mobile TE 101, the packet sent from TE 102 is encapsulated by adding IP header information in which the destination IP address (i.e., DA) is set to be RAC 601 to which the TE 101 has been moved, while the source IP address (i.e., SA) is set to be RAS 301 (see step S33). The encapsulated packet is sent from RAS 301 to RAC 601 (see step S34).

RAC 601 then decapsulates the transmitted packet including the IP header information (see step S35), and sends the packet to RNW 501. In this way, the packet is transmitted to the mobile TE 101 (see step S36).

Figure 8:
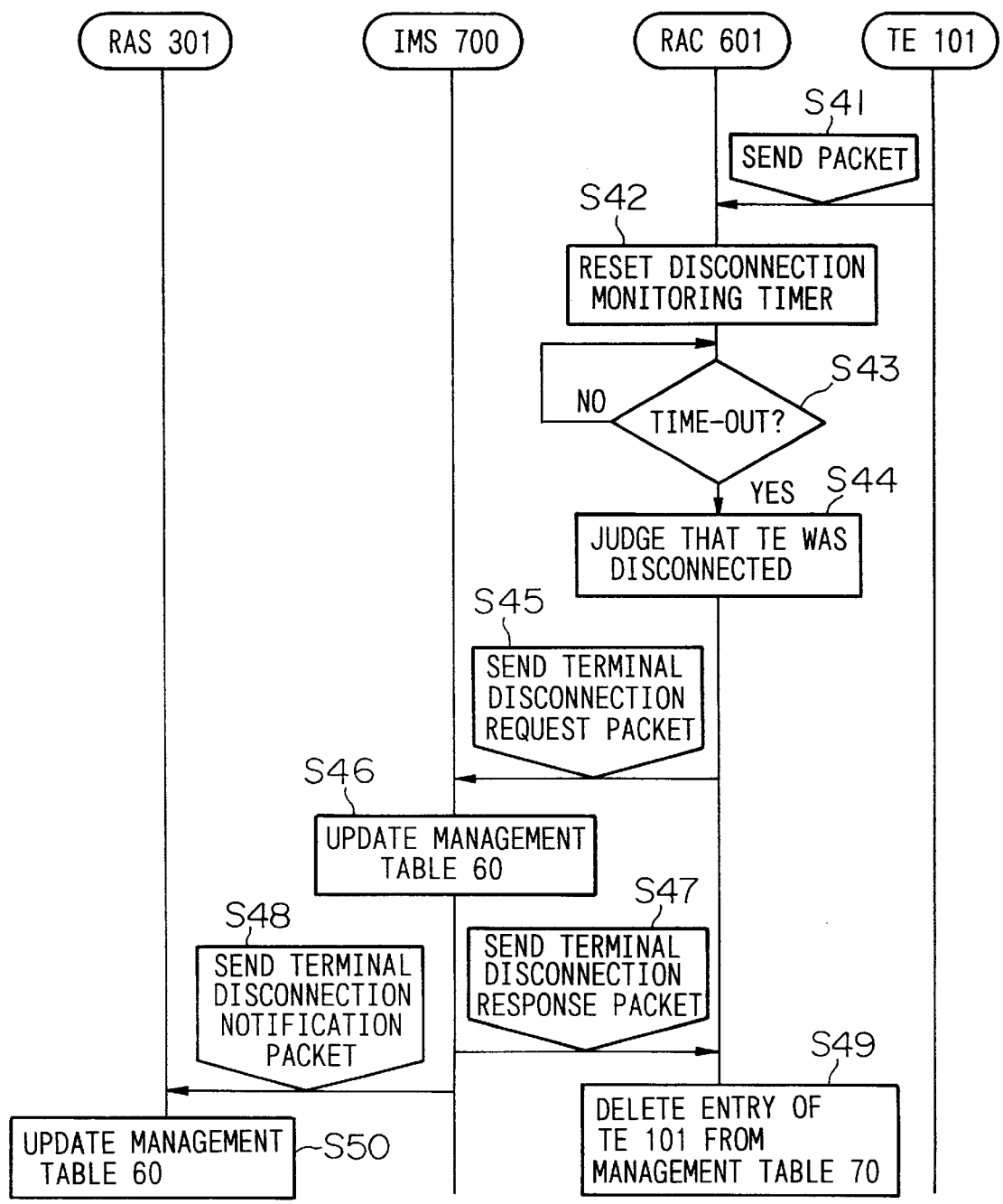
FIG. 8 shows an example of the automatic disconnection sequence according to the present invention.

FIG. 8 shows an example of the automatic terminal-disconnection sequence according to the present invention, and this example shows a case in which TE 101 which was moved to RNW 501 returns to HNW 200.

Every time TE 101 sends a packet (of the MAC frame) (see step S41), RAC 601 resets a terminal-disconnection monitor timer relating to TE 101, where the timer value automatically increases along elapsed time (see step S42). When the timer value exceeds a predetermined threshold value (see step S43), RAC 601 judges that the TE 101 has been disconnected from RNW 501 (see step S44). By using such a timer, disconnection processing under multi-protocol, that is, processing independent of the protocols of the terminal side, can be realized. When RAC 601 detects time-out, the RAC sends IMS 700 a terminal disconnection request packet, the packet including the MAC address of TE 101 and the IP address of RAC 601 (see step S45).

When IMS 700 receives the request packet, the IMS updates data relating to TE 101 in location information management table 60 such that the registered data is changed from the IP address of RAC 601, to which TE 101 was moved and connected, to the IP address of RAS 301, which is the default location of TE 101 (see step S46). In addition, IMS 700 sends a terminal disconnection response packet to RAC 601 (see step S47), and further sends RAS 301 a terminal disconnection notification packet with the MAC address of TE 101 and the IP address of RAC 601 (see step S48).

At the RAC 601 side, by receiving the terminal disconnection response packet from IMS 700, the entry relating to TE 101 in home address management table 70 is deleted, by which the processing with respect to the terminal disconnection is completed (see step S49). When RAS 301 receives the terminal disconnection notification packet from IMS 700, the RAS updates the location information management table 60 so as to register the present location of TE 101 (see step S50).

According to this method, when a fixed time passed after a TE is disconnected, the disconnection can always be detected, and the management table for managing the location of each terminal is automatically updated according to the relevant movement of a terminal. Therefore, it is unnecessary to rearrange the system environment in accordance to movement of a terminal between networks. However, in this case, it is necessary to select a threshold value suitable to all TEs in consideration of characteristics of TEs such as frequency in communication and communication time; thus, detection of terminal disconnection may occasionally be delayed.

Figure 12:
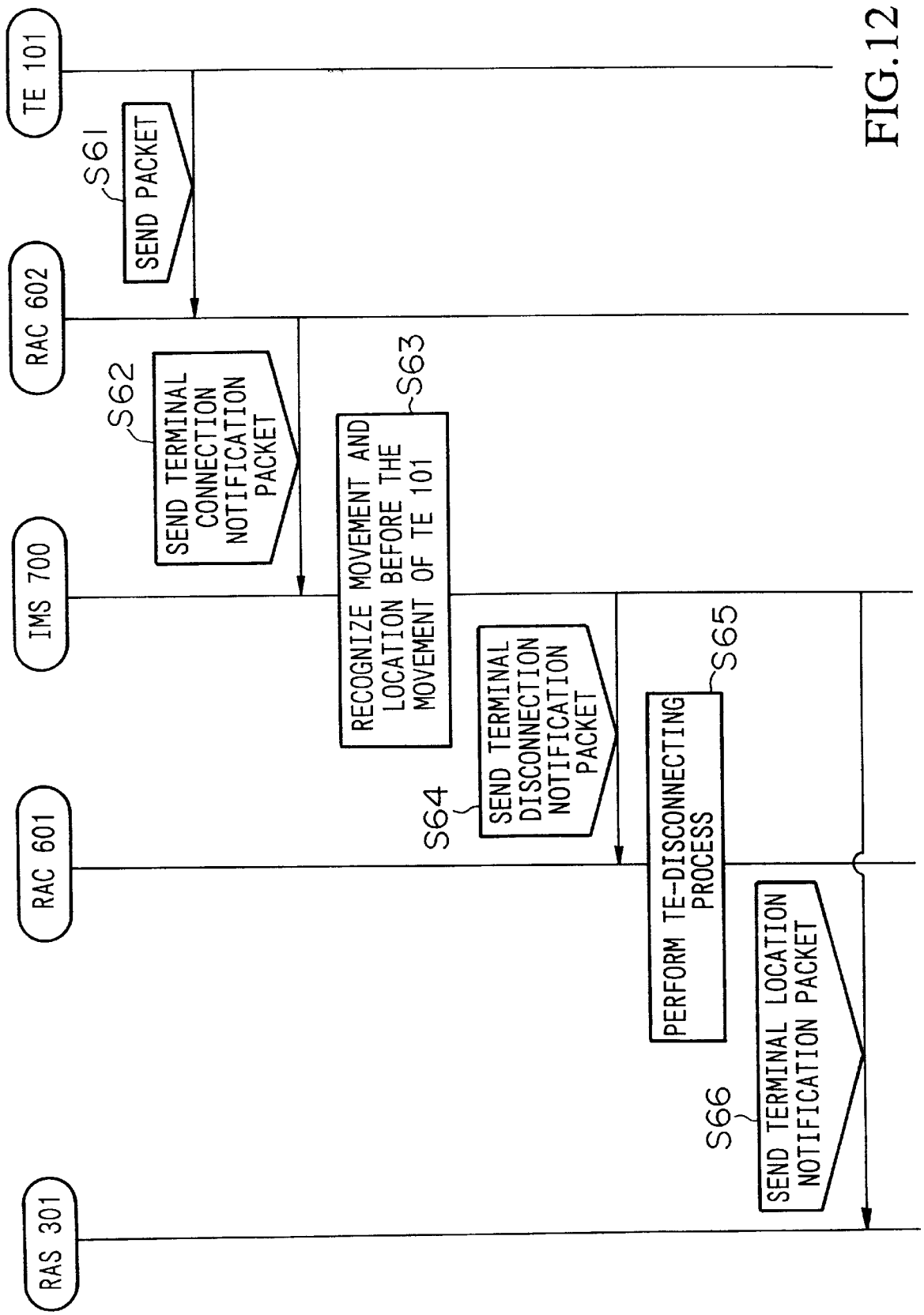
FIG. 12 shows an example of the automatic disconnection sequence according to the present invention.

FIG. 12 shows the second example of the terminal disconnection sequence according to the present invention. This example shows a case in which TE 101 moves from RNW 501 to RNW 502.

When TE 101 transmits a packet after the TE is moved to RNW 502 (see step S61), RAC 602 detects the packet and sends IMS 700 a terminal connection notification packet for indicating that TE 101 has been connected (see step S62). When IMS 700 receives this packet, the IMS searches the location information management table 60 and recognizes that the TE 101 has been moved and the RNW to which the TE was connected before the movement is "501" (see step S63). IMS 700 sends RAC 601 a terminal disconnection notification packet for indicating the movement of TE 101 (see step S64).

RAC 601 recognizes disconnection of TE 101 by receiving this notification packet, and performs a disconnecting process by deleting information relating to TE 101 in its own home address management table 70 (see step S65). In addition, IMS 700 simultaneously sends RAS 301 a terminal location notification packet for indicating the movement of TE 101 (see step S66).

In this method, terminal disconnection cannot be detected by the time the terminal is going to communicate after the movement (i.e., disconnection); however, this method has an effect that disconnection can be detected as soon as the terminal begins communication.

Terminal disconnection may be detected by using only one of the above-explained first and second methods, or by using both methods together. By using these methods together, more precise terminal detection can be performed.

Figure 13:
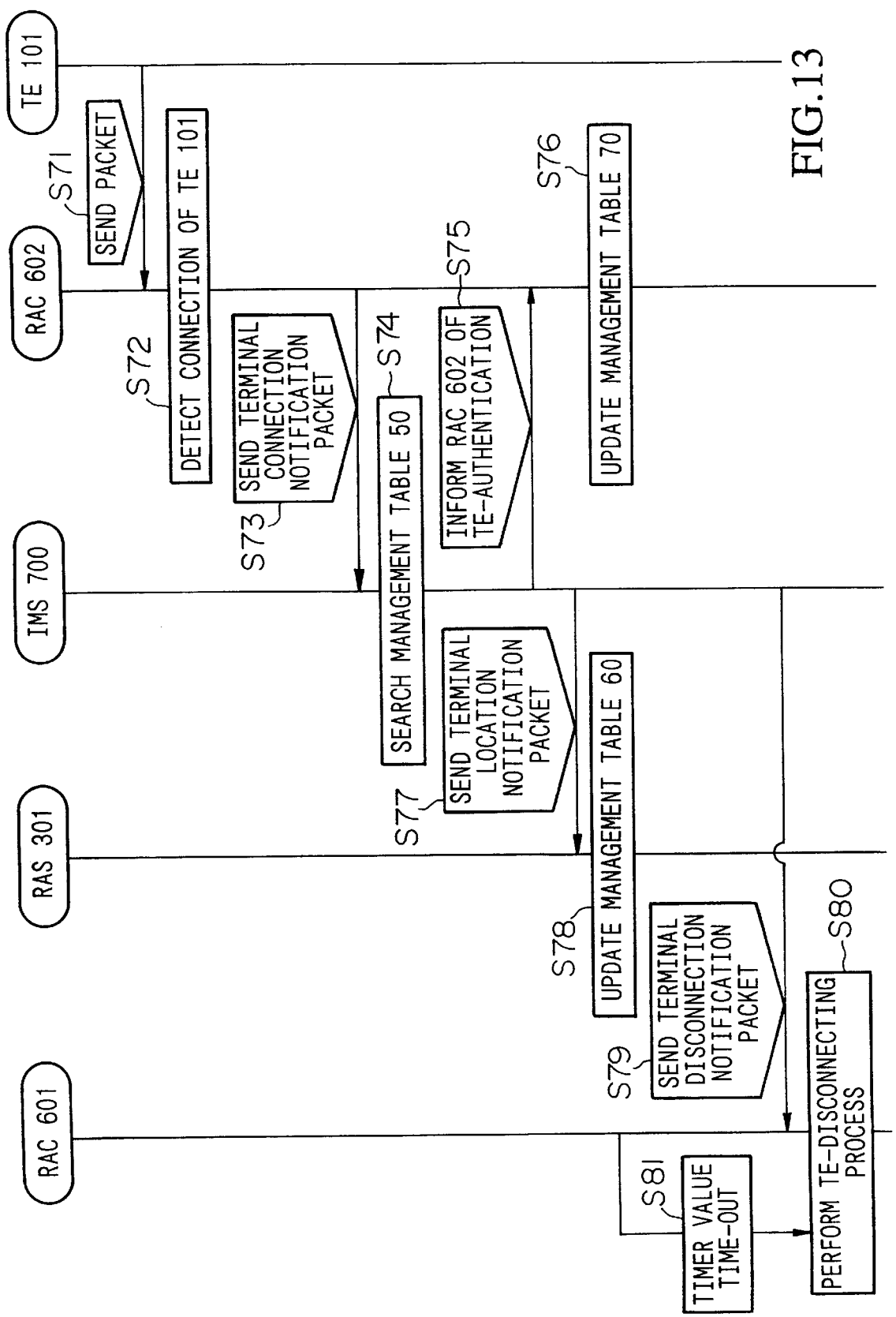
FIG. 13 shows an example of the automatic disconnection sequence according to the present invention.

FIG. 13 shows an exemplary sequence in which both methods are used. This example also shows a case in which the TE 101, which was connected to RNW 501 and communicates via the RNW 501, is moved to RNW 502 and begins communication via the RNW 502.

That is, when TE 101 which was connected to RNW 501 sends a packet after it moves to RNW 502 in order to start communication (see step S71), RAC 602 detects the packet and searches its own home address management table 70. Here, no record relating to TE 101 exists in the table, thus RAC 602 recognizes that the TE 101 has been newly connected (see step S72).

RAC 602 then sends IMS 700 a terminal connection notification packet including the MAC address of TE 101 and identification information of its own (i.e., the IP address of RAC 602) (see step S73). When IMS 700 receives this packet, the IMS searches its own initial information management table 50, based on the information included in the packet (see step S74).

The TE 101 has already been registered in this table; thus, IMS 700 informs RAC 602 of authentication of TE 101 (see step S75), and RAC 602 adds a record relating to TE 101 to its own management table 70 (see step S76). IMS 700 simultaneously sends RAS 301 a terminal location notification packet which indicates a new connecting point of TE 101 (see step S77).

When RAS 301 receives this packet, the RAS updates data relating to the location (of the connection of) TE 101 in its own location information management table 60 (see step S78). On the other hand, IMS 700 can recognize that the TE 101 was connected to RAC 601 until that time by searching the management table 60; therefore, IMS 700 sends RAC 601 a terminal disconnection notification packet (see step S79). When RAC 601 receives this packet, the RAC performs a disconnecting process by deleting a record relating to TE 101 from its own management table 70 (see step S80).

On the other hand, the timer value of a terminal disconnection monitoring timer for TE 101, which is set by RAC 601, increases along elapsed time from the time the RAC 601 received the last packet from TE 101. Therefore, this timer becomes "time-out" after a predetermined fixed time elapses, by which terminal disconnection is detected (that is, when the set time limit is exceeded, the terminal disconnection is detected) (see step S81). As a result, RAC 601 performs a disconnecting process by deleting a record relating to TE 101 from its own management table 70 (see step S80).

In this way, RAC 601 can detect disconnection of TE 101 in accordance with either earlier information obtained by receiving of the terminal disconnection notification packet or by time-out of the terminal disconnection monitoring timer. That is, terminal disconnection can be detected either by (i) the first method of using a terminal disconnection monitoring timer when a predetermined time elapses even if the TE has not yet restarted communication after disconnection, or by (ii) the above second method if the TE restarts communication via a RNW to which the TE was newly connected. By using the two methods as described above, terminal disconnection can be much more precisely detected, and also in this case, it is of course unnecessary to provide a special function in the TE side.

Figure 14:
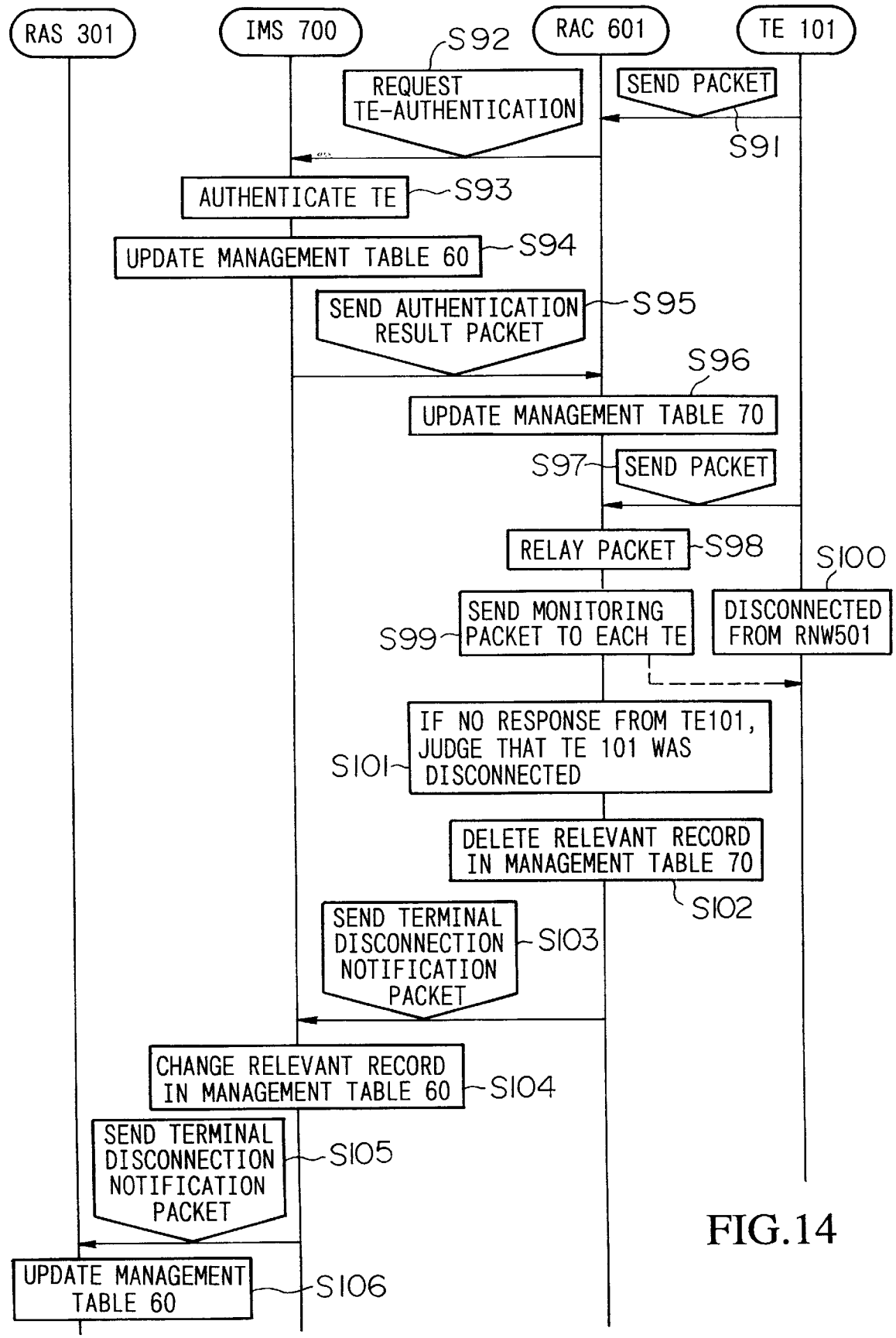
FIG. 14 shows an example of the automatic disconnection sequence according to the present invention.

FIG. 14 shows the third example of the terminal disconnection sequence according to the present invention. This example shows a case in which terminal disconnection is realized by applying the above-mentioned ARP method.

This example shows a case in which TE 101 is moved from HNW 200 to RNW 501 and restarts communication there. When TE 101 transmits a first packet after the movement (see step S91), RAC 601 which detected the packet searches its own management table 70. Here, registered information relating to TE 101 is not found; thus, RAC 601 sends IMS 700 a terminal authentication request packet (see step S92). This packet includes the MAC (i.e., layer 2) address of TE 101 and identification information (i.e., the IP address) of the RAC at the request side.

IMS 700 searches initial information management table 50 with reference to the MAC address included in this packet, and authenticates that TE 101 has already been registered (see step S93). IMS 700 further searches location information management table 60, and detects that the connection location of TE 101 is changed from HNW 200 to RNW 501. IMS 700 then updates the relevant record in the table 60 so as to manage the new connection point of TE 101 (see step S94). IMS 700 then returns an authentication result packet to RAC 601 (see step S95).

According to this packet, the fact that the TE 101 has already been registered is authenticated; therefore, RAC 601 adds MAC address information relating to TE 101 to its own management table 70, based on the contents of the packet (see step S96).

Next, when TE 101 transmits a second (or further-order) packet (see step S97), RAC 601 authenticates the packet with reference to the information in the table 70 and relays the packet (see step S98).

RAC 601 sends each TE, which is registered in its own management table 70, a monitoring packet, in which the IP (i.e., layer 3) address of the TE is set, for asking the MAC (i.e., layer 2) address of the TE (see step S99). That is, a monitoring packet is also sent to TE 101, and the destination IP address of the packet is set to be that of TE 101. Therefore, if TE 101 is disconnected from RNW 501 (see step S100), an expected response packet is not returned to RAC 601.

If a response packet is not returned to RAC 601 after a predetermined fixed time elapses, RAC 601 judges that the TE 101 was disconnected (see step S101). In this case, RAC 601 deletes the relevant record in its own management table 70 (see step S102), and sends IMS 700 a terminal disconnection notification packet (see step S103).

When IMS 700 receives the terminal disconnection notification packet, the IMS changes the relevant record in its own location information management table 60 such that the present location of TE 101 is set to be the IP address of RAS 301 of HNW 200, which is the default location of TE 101 (see step S104). IMS 700 then sends RAS 301 of the HNW of TE 101 a terminal disconnection notification packet (see step S105). RAS 301 also updates the contents of its own location information management table 60, according to the movement of TE 101 (see step S106).

Therefore, in this exemplary case, when a fixed time passes after disconnection of TE 101, the disconnection can be detected by such a monitoring packet (and a response packet) as an application of the above-mentioned ARP method. That is, by providing a function for automatically detecting the terminal movement at the RAC, RAS, and IMS sides, terminal disconnection can be detected without any special function provided at the terminal side.

What is claimed is:

1. A control system for a virtual local area network (VLAN) in which a home network to which one or more terminals are ordinarily connected, and at least one remote network to which said terminals are connected when they are moved, are connected with each other via a global network, said system comprising:

a remote access server connected to the home network, said remote access server having an Internet Protocol (IP) address for the global network, and also having a management table for indicating a location of each terminal under connection, wherein when one of the terminals is moved to one of said at least one remote network, the remote access server performs a control necessary for said one of the terminals to access the home network as this terminal did before it moved to another remote network;

a remote access client connected to each remote network, for controlling communication between the remote network and the global network, said remote access client having an IP address for the global network, and also having a management table for indicating a correspondence relationship between each terminal which is connected to the remote network and the home network; and a VLAN management server connected to the global network, for managing packet transmission and the location of each terminal, said server having an IP address for the global network, and also having a management table for indicating a correspondence relationship between each terminal and the remote access server and for indicating a location of each terminal under connection, wherein if one of the terminals is connected to said at least one remote network and is managed in the remote network, the remote access client detects disconnection of the terminal from the remote network based on timing information of a packet transmitted from the terminal or connection information which is generated if the terminal is further moved to another remote network, and the remote access client then informs the VLAN management server of the disconnection, and wherein the VLAN management server informs the remote access server of the disconnection and performs processing control for changing management data of the system according to the terminal disconnection.

2. A control system as claimed in claim 1, wherein in the detection of the terminal disconnection:

every time the connected terminal transmits a packet, the remote access client resets a monitoring timer for monitoring disconnection of the terminal, whose timer value automatically increases, and judges that the terminal was disconnected when the time value exceeds a predetermined threshold value, and notifies the VLAN management server of the disconnection of the terminal.

3. A control system as claimed in claim 1, wherein two or more remote networks are provided as said at least one remote network, and in the detection of the terminal disconnection, when one of the terminals is moved from a first remote network to a second remote network:

when the terminal transmits a packet, the remote access client of the second remote network detects the packet, and notifies the VLAN management server that the terminal has been connected to the second remote network, and the notified VLAN management server searches its own management table, recognizes that the remote network to which the terminal was connected until that time is the first remote network, and notifies the remote access client of the first remote network of the disconnection of the terminal.

4. A control system as claimed in claim 1, wherein in the detection of the terminal disconnection:

the remote access client sends a monitoring packet for every predetermined time to each connected terminal which is registered in its own management table, and if a response packet is not returned from a relevant terminal, the remote access client judges that the relevant terminal was disconnected and notifies the VLAN management server of the disconnection of the terminal.

5. A control system as claimed in claim 4, wherein the monitoring packet includes a layer 3 address of the OSI, while the response packet includes a layer 2 address of the OSI.

6. A control system as claimed in claim 1, wherein when the terminal disconnection is detected, the remote access client of the remote network from which the terminal was disconnected deletes information relating to the relevant terminal in its own management table.

7. A control system as claimed in claim 1, wherein when the terminal disconnection is detected:

the VLAN management server updates the contents of its own management table, and notifies the remote access server of the terminal disconnection; and the notified remote access server updates the contents of its own management table.

8. A control system as claimed in any one of claims 1–7, wherein the global network is the Internet.

9. A control system as claimed in any one of claims 1–7, wherein the global network is an intranet.

10. A control method used in a virtual local area network (VLAN) system in which a home network to which one or more terminals are ordinarily connected, and two or more remote networks to which said terminals are connected when they are moved, are connected with each other via a global network, wherein:

if one of the terminals is connected to one of the remote networks and is managed in the remote network, said method comprises the steps of:

detecting disconnection of the terminal from the remote network based on timing information of a packet transmitted from the terminal or connection information which is generated if the terminal is further moved to another remote network;

performing processing control for changing management data of the system according to the terminal disconnection, and wherein when one of the terminals is moved from a first remote network to a second remote network, the step of detecting disconnection of the terminal includes the substeps of:

detecting packet transmission of the terminal; and recognizing that the remote network to which the terminal was connected before the terminal was moved is the first remote network, and notifying the remote access client of the first remote network of the disconnection of the terminal.

11. A control method as claimed in claim 10, wherein the step of detecting the terminal disconnection includes the steps of:

resetting a monitoring timer for monitoring disconnection of the terminal, whose time value automatically increases, every time the connected terminal transmits a packet; and judging that the terminal was disconnected when the timer value exceeds a predetermined threshold value.

12. A control method as claimed in claim 10, wherein the step of detecting the terminal disconnection includes the steps of:

sending a monitoring packet for every predetermined time to each terminal which is connected to the relevant remote network; and judging that a relevant terminal was disconnected if a response packet is not returned from the relevant terminal.

13. A control method as claimed in claim 12, wherein the monitoring packet includes a layer 3 address of the OSI, while the response packet includes a layer 2 address of the OSI.

14. A control method as claimed in any one of claims 10–12, wherein the global network is the Internet.

15. A control method as claimed in any one of claims 10–12, wherein the global network is an intranet.

16. A virtual local area network (VLAN) management server used in a VLAN system in which a home network to which one or more terminals are ordinarily connected, and two or more remote networks to which said terminals are connected when they are moved, are connected with each other via a global network, said server connected to the global network, said server having an IP address for the global network, and also having a management table for indicating a correspondence relationship between each terminal and a remote access server of the remote network and for indicating a location of each terminal under connection, and said server comprising:

means for managing packet transmission and the location of each terminal based on the management table;

means for detecting connection information which is generated if the terminal, which was connected to one of the remote networks, and was managed in the remote network, is further moved to another remote network; and means for detecting disconnection of the terminal from the remote network based on the connection information. and for performing processing control for changing management data of the system according to the disconnection of the terminal, and wherein in the detection of the terminal disconnection, when one of the terminals is moved from a first remote network to a second remote network and the VLAN management server is notified of terminal connection via the second remote network, said means for detecting connection information searches the management table, and said means for detecting disconnection of the terminal recognizes that the remote network to which the terminal was connected until that time is the first remote network, and notifies a remote access client of the first remote network of the disconnection of the terminal.

17. A VLAN management server as claimed in claim 16, wherein when the terminal disconnection is detected, said means updated the contents of the management table.

* * * * *